United States Patent [19]
Avramidis

[11] 3,965,764
[45] June 29, 1976

[54] PIGGYBACK BELT DRIVE ASSEMBLY

[75] Inventor: Stellios Anthony Avramidis, Greenfield, Ind.

[73] Assignee: FMC Corporation, San Jose, Calif.

[22] Filed: July 5, 1974

[21] Appl. No.: 486,262

[52] U.S. Cl. .................................. 74/221; 74/234; 74/231 R; 74/722; 74/229
[51] Int. Cl.² .................... F16H 7/00; F16H 7/02
[58] Field of Search ............ 74/221, 231 R, 231 P, 74/232, 233, 234, 236, 216.5, 665, 664, 665 A, 665 GE

[56] References Cited
UNITED STATES PATENTS

| | | | |
|---|---|---|---|
| 1,921,749 | 8/1933 | Haug | 74/221 |
| 1,955,813 | 4/1934 | Klappnecker | 74/221 |
| 3,863,513 | 2/1974 | Schnettler | 74/221 |

FOREIGN PATENTS OR APPLICATIONS

| | | | |
|---|---|---|---|
| 131,165 | 8/1901 | Germany | 74/221 |

*Primary Examiner*—Samuel Scott
*Assistant Examiner*—A. Russell Burke
*Attorney, Agent, or Firm*—C. E. Tripp; J. F. Verhoeven

[57] ABSTRACT

There is disclosed a belt drive system in which a first belt is trained over a drive pulley and a driven pulley. A second belt is mounted over the first belt on the drive pulley and is trained over two other driven pulleys. The first belt has an outer surface with alternate longitudinally extending ridges and grooves and the second belt has an inner surface with alternate longitudinally extending grooves and ridges for mating engagement with the first belt at the drive pulley. The two driven pulleys which receive the second belt have circumferential ridges and grooves for mating engagement with the second belt.

5 Claims, 5 Drawing Figures

U.S. Patent June 29, 1976 3,965,764
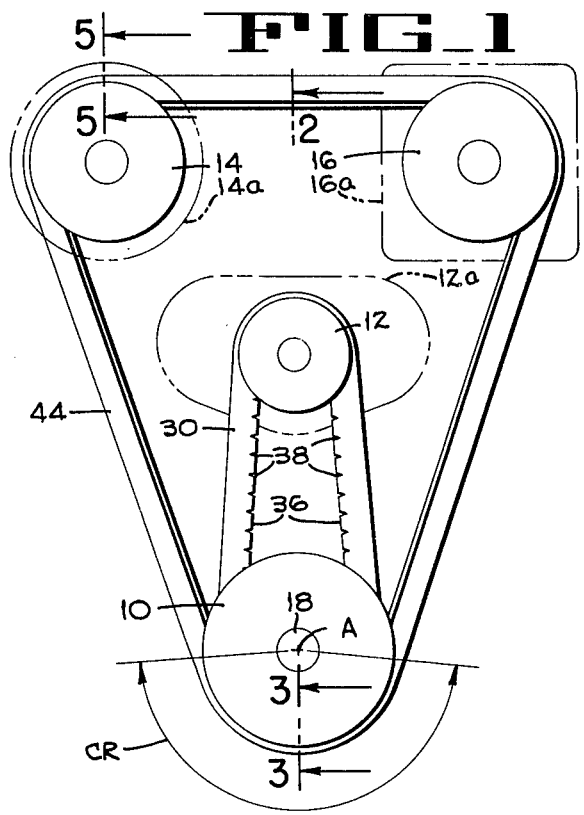
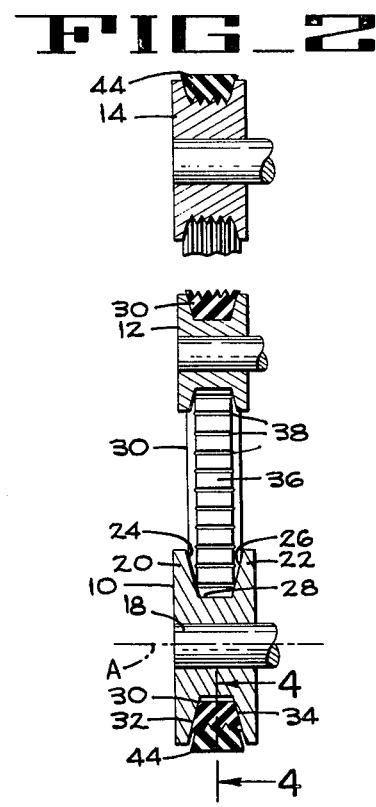
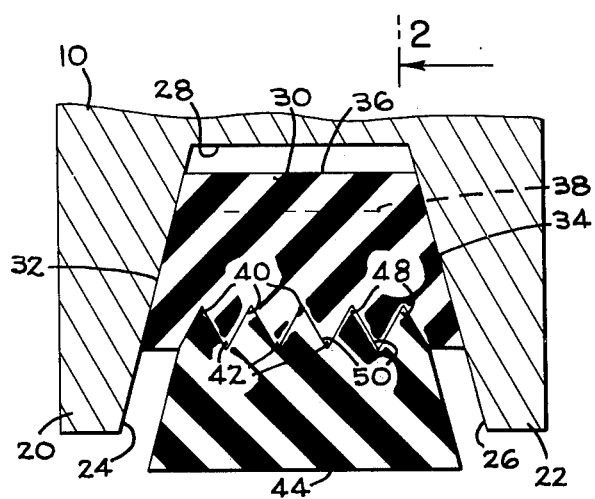
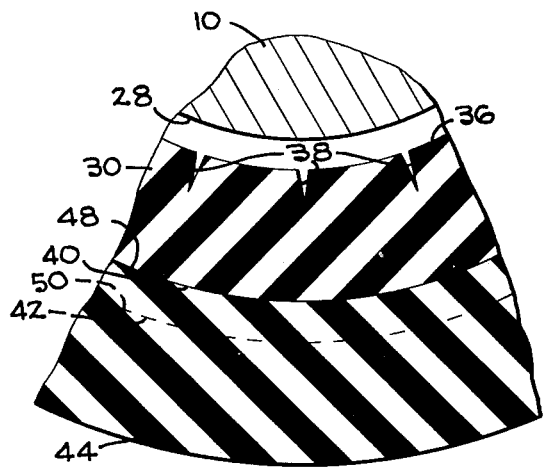
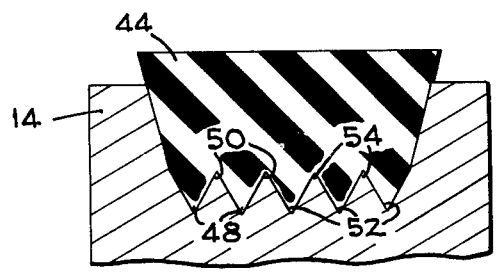

PIGGYBACK BELT DRIVE ASSEMBLY

BACKGROUND OF THE INVENTION

Frequently, two or more belts are used in a belt drive to transmit power from a drive member, such as a drive pulley, to a driven member, or members, such as driven pulleys. In some instances, two or more belts are required primarily because of the large amount of power which must be transmitted. In other instances, two or more belts are used primarily to provide different speed ratios to the different devices being driven. In either event, the two or more belts are used in an independent manner, each mounted separately from the other.

In the copending United States patent application of L. J. Stephanoff, Ser. No. 422,250, filed Dec. 6, 1973, and assigned to the same assignee as the present invention, (now abandoned in favor of Continuation-in-Part application Serial No. 518,133 filed October 25, 1974) a belt drive system is disclosed in which power is transmitted from a drive pulley to driven pulleys through the use of two belts, one of which is mounted directly on the other, in "piggyback" fashion, at the drive pulley. The inner belt through its side walls provides a good gripping engagement with the side walls of the drive pulley, while the outer belt has the flexibility and strength to transmit the power between the inner belt and the driven pulleys. Gripping contact between the two belts is provided by mutually engaging teeth on the outer surface of the inner belt and on the inner surface of the outer belt.

In the copending United States patent application of Avramidis and Partridge, Ser. No. 486,261, filed 7/5/74, a piggyback dual belt drive arrangement is used to drive two separate sets of automobile accessories, one set being driven by one of the stacked belts and the other set being driven by the other stacked belt.

It has been known heretofore to provide belts having one surface with alternate ridges and grooves to mate with alternate grooves and ridges on a pulley.

SUMMARY OF THE INVENTION

In the present invention, an improved belt arrangement of the piggyback type is disclosed to provide separate characteristics for the driving function (for example, gripping engagement with the drive pulley provided by one belt and strength and flexibility provided by the other belt), or to provide a separate drive for each of two driven pulleys, or sets of driven pulleys.

In the present invention, one belt is mounted directly on top of the other belt on one of the pulleys, such as the drive pulley, but each belt leads to a separate driven pulley, or set of driven pulleys. The power is transmitted between the inner belt and the outer belt by means of alternate, longitudinally extending, grooves and ridges on the outer surface of the inner belt and also on the inner surface of the outer belt. These alternate longitudinally extending grooves and ridges of the two belts, which are in mating engagement on at least one pulley, such as the drive pulley, provide a large engaging surface between the two belts. The large mutually engaging surfaces provide greater frictional grip between the two belts so that maximum power can be transmitted therebetween.

It is therefore an object of the present invention to provide a piggyback belt drive in which large surface areas of the mutually engaged belts are in contact.

BRIEF DESCRIPTION OF THE DRAWINGS

FIG. 1 is a belt drive system incorporating the present invention.
FIG. 2 is a view taken on the line 2—2 of FIG. 1.
FIG. 3 is a view taken on the line 3—3 of FIG. 1.
FIG. 4 is a view taken on the line 4—4 of FIG. 2.
FIG. 5 is a view taken on the line 5—5 of FIG. 1.

DESCRIPTION OF THE PREFERRED EMBODIMENT

There is shown in FIG. 1, a belt drive system in which power is transmitted from a drive pulley 10 (which is rotated by an external source of power, not shown) to a plurality of driven pulleys 12, 14 and 16. The driven pulleys may, for example, be connected to driven devices, indicated at 12a, 14a and 16a.

The drive pulley 10, which is mounted on a shaft 18, has side flanges 20 and 22, with inwardly sloping inner faces 24, 26 terminating at a central surface 28 parallel to the central axis A of shaft 18.

A first endless belt 30, which is received on drive pulley 10, has sloping side surfaces 32, 34 for gripping engagement with the sloping inner faces 24, 26 of the pulley flanges 20, 22 of pulley 10. The inner surface 36 of belt 30 has transverse grooves 38, as shown in FIG. 4, to facilitate flexing of the belt. The outer surface of the first belt 30 has a plurality of continuous, longitudinally extending, endless, alternate grooves 40 and ridges 42. The first belt 30 is trained over driven pulley 12, which may be an idler pulley (as in the Stephanoff patent disclosure) or may be a driven pulley (as in Avramidis and Partridge patent disclosure). In either case, the first belt 30 makes good driving contact with the walls 24 and 26 of the drive pulley flanges.

A second endless belt 44 is received on the drive pulley 10 over the first belt 30. The inner surface of the belt has continuous, endless, alternate ridges 48 and grooves 50 for mating engagement with the grooves 40 and ridges 42 of the inner, or first, belt 30. The large, mutually contacting, surface areas of the belts, as shown in FIG. 3 (which extend through the contact range CR as shown in FIG. 1) assures a positive gripping relationship between the two belts to permit the transfer of power from the inner belt to the outer belt without slippage.

For illustrative purposes, the second belt 44 is coupled to the first belt at the drive pulley. It should be understood, however, that the second belt could be coupled to the first belt at the driven pulley if the driven pulley were located in a convenient position (such as the position of the pulley 10) to receive both belts.

The second belt 44 is trained around the pulleys 14 and 16 which have circumferential grooves 52 and ridges 54 (FIG. 5) to receive the ridges 48 and 50 of the second belt. It should be noted that the pulleys 14 and 16 may be smaller or larger than the pulley 12 to drive the units connected, respectively, thereto, at different speeds than the unit connected to pulley 12.

Although the best mode contemplated for carrying out the present invention has been herein shown and described, it will be apparent that modification and variation may be made without departing from what is regarded to be the subject matter of the invention.

What is claimed is:

1. A drive system for a plurality of pulleys comprising a pair of endless drive belts received one over the other on at least one of said pulleys, the inner one of said belts on said one pulley received over another of said pulleys, said inner belt having an outer surface with a plurality of alternate longitudinally extending ridges and grooves therein, an outer belt of said pair being received over yet another of said pulleys, said outer belt having an inner surface with a plurality of alternate longitudinally extending grooves and ridges therein, the ridges and grooves on said inner and outer belts received in mating engagement at said one pulley.

2. A drive system for a plurality of pulleys including a drive pulley and at least two driven pulleys comprising a first endless belt received over the drive pulley and at least one of said driven pulleys, said first belt having an outer surface with a plurality of alternate longitudinally extending ridges and grooves, a second endless belt placed over said first belt on at least one of the pulleys on which the first belt is received, said second belt also placed over at least one driven pulley on which the first belt is not received, said second belt having an inner surface with a plurality of alternate longitudinally extending grooves and ridges for mating engagement with the ridges and grooves of the first belt.

3. A drive system for a plurality of pulleys including a drive pulley and at least two driven pulleys comprising a first endless belt received over the drive pulley and at least one of said driven pulleys, said first belt having an outer surface with a plurality of alternate longitudinally extending ridges and grooves, a second endless belt mounted over said first belt on at least one of the pulleys on which the first belt is received, said second belt also placed over at least one driven pulley on which the first belt is not received, said driven pulley having circumferentially alternate ridges and grooves, said second belt having an inner surface with a plurality of alternate longitudinally extending grooves and ridges for mating engagement with the ridges and grooves of the first belt and said driven pulley.

4. The drive system of claim 3 in which said belts have endless, flexible stringers therein to increase the strength of the belts.

5. The drive system of claim 3 in which said driven pulleys are of different size.

* * * * *